United States Patent [19]

Johansson

[11] Patent Number: 4,889,684
[45] Date of Patent: Dec. 26, 1989

[54] HYDRAULIC REINFORCEMENT OF CHANNEL AT LOWER TIE-PLATE IN BWR FUEL BUNDLE

[75] Inventor: Eric B. Johansson, San Jose, Calif.

[73] Assignee: General Electric Company, San Jose, Calif.

[21] Appl. No.: 226,482

[22] Filed: Aug. 1, 1988

[51] Int. Cl.$^4$ ............................................. G21C 3/32
[52] U.S. Cl. ................................... 376/444; 376/443; 376/439; 376/203
[58] Field of Search ............... 376/443, 444, 439, 203, 376/204

[56] References Cited

U.S. PATENT DOCUMENTS

| | | | |
|---|---|---|---|
| 3,689,358 | 9/1972 | Smith | 376/443 |
| 3,697,376 | 10/1972 | Mefford | 376/443 |
| 3,715,274 | 2/1973 | Venier | 376/443 |
| 4,035,233 | 7/1977 | Williamson | 376/443 |
| 4,663,118 | 5/1987 | Nelson | 376/445 |
| 4,749,543 | 6/1988 | Crowther | 376/443 |

Primary Examiner—Donald P. Walsh
Attorney, Agent, or Firm—Robert R. Schroeder

[57] ABSTRACT

In a nuclear boiling water reactor, an improved lower tie-plate and fuel channel interface for a boiling water reactor fuel bundle is disclosed. The fuel bundle has a lower tie-plate for supporting fuel rods and permitting the introduction of fluid interior of the fuel bundle. An upper tie-plate maintains the lower tie-plate supported rods in side-by-side relation and has apertures for discharging a mixture of water and steam. The fuel rods extend between the tie-plates for the generation of steam with some of the fuel rods forming a threaded connection fastening the tie-plates together. A polygon sectioned channel, preferably square, surrounds the tie-plates and fuel rods for the confining of fluid flow between the tie-plates interior of the bundle. The interface of the channel as it surrounds the lower tie-plate is reconfigured. This reconfiguration includes means for inducing a rapid pressure drop from the interior juncture of the lower tie-plate and channel to and towards the exterior juncture of the lower tie-plate and channel. Because of this rapid pressure drop the bottom portion of the square sectioned channel is not subject to the pressure loading, and the bottom portion reinforces the upper portion. In one embodiment, a labyrinth seal configuration is made in the region of overlap between channel and the lower tie-plate, consisting of intermittent interruptions of an otherwise constant flow area between the lower tie-plate channel. The labyrinth seal is disclosed as configured either in the lower tie-plate or channel.

In a second, preferred embodiment, a diffuser is incorporated in the region of overlap between the channel and lower tie-plate. The diffuser causes a pressure distribution in the overlap region which limits the deflection of the channel.

8 Claims, 7 Drawing Sheets

HYDRAULIC REINFORCEMENT OF CHANNEL AT LOWER TIE-PLATE IN BWR FUEL BUNDLE

BACKGROUND OF THE INVENTION

This invention relates to the fuel bundles of boiling water nuclear reactors and more particularly relates to an improved interface between the lower tie-plate and fuel bundle channel.

Outline of the Problem

Boiling water nuclear reactors generate steam in their core. This core is composed of an array of side-by-side vertically upstanding square sectioned fuel bundles. These fuel bundles divide the core region of the reactor into the so-called core bypass region, exterior of the fuel bundles, and the core region interior of the fuel bundles. The flow region interior of the fuel bundles is at a higher pressure than the bypass region. Typically, water is forced to circulate through the fuel bundles by pumping.

The flow region exterior of the fuel bundles is the core bypass region. This region contains nonboiling water and is used to provide increased presence of water for the moderation of high speed neutrons to low speed neutrons so that the chain reaction in the boiling water reactor can continue.

In order for this invention to be completely understood, the construction of a typical fuel bundle must be understood. Thereafter, the operation of such a fuel bundle during normal online operation of the reactor will be set forth. The problem of creep and pressure induced deflection of the channel in the vicinity of the lower tie-plate will be set forth. It is this deflection problem to which this invention is addressed.

Then the problem of reflood of the core during a loss of coolant accident will be discussed. The participation of the lower tie-plate in such reflood will be set forth in preparation for an improvement in reflood of the disclosed invention.

Fuel bundle construction can be summarized in a simplified format sufficient for the understanding of this invention.

A fuel bundle consists of a group of fuel rods between an upper tie-plate and a lower tie-plate. The upper tie-plate and the lower tie-plate and the fuel rods extending therebetween are provided with a polygon section, which section is preferably square. This section is surrounded by a water impervious channel which forms a water tight boundary from the lower tie-plate to the upper tie-plate.

The lower tie-plate consists of a plate which supports the lower ends of the fuel rods and an integral tubular structure which channels flow from below the lower tie-plate to the bottom of the lower tie-plate. The plate has openings between the fuel rods, and flow passes through these openings and into the fuel bundle.

The lower tie-plate has four purposes.

First, it supports the heavy fuel rods.

Second, it forms a mechanical connection between the upper tie-plate and the lower tie-plate by threaded connection between some of the fuel rods.

Third, the lower tie-plate allows water inflow from below the fuel bundle into the interior of the fuel bundle.

Finally, the lower tie-plate in cooperation with the fuel bundle channel restricts leakage flow from the interior of the fuel bundle to the bypass region. This invention provides an improved method for restricting the leakage flow.

There are two avenues of water flow through the lower tie-plate.

The first avenue of flow is through openings between the fuel rod locations, which allow water used for both neutron moderation and steam generation to flow under pressure upwardly through the fuel bundle. This flow enters and passes from the lower tie-plate in the form of pure water. Steam is generated within the fuel bundle and passes out through the upper tie-plate in the form of a steam water mixture.

The second avenue of flow is from the major aperture in the tie-plate through the side of the tie-plate to the so-called core bypass region. This flow occurs through small metering apertures, some of which are formed in the side of the lower tie-plate. During normal operation, these apertures supply the core bypass region with low pressure water. During a loss of coolant accident, these same apertures in the lower tie-plate permit so-called "reflood" of the interior of the fuel bundles from the core bypass region.

Having discussed in general terms the construction of the fuel bundle and its relation to the core, the function of the fuel bundle during normal operation can be set forth.

The problem of pressure acting on the channel of the lower tie-plate can be understood.

During normal operation, water is introduced in forced circulation from the reactor and in effect pumped through the lower tie-plate of the fuel bundle. Water around the fuel rods is confined along a path by the fuel channel. A water steam mixture exits the top of the fuel bundle. After exit at the top of the fuel bundle, the water steam mixture passes on to steam separators with the water being recirculated and the steam being separated for power generation.

The core bypass region also has a flow. This flow occurs among other places through the collective apertures in the sides of the lower tie-plates of all of the fuel bundles. Water is metered to the core bypass region at a reduced pressure. Thus, there is a substantial pressure differential at the lower tie-plate across the fuel bundle channel. The effect of this pressure differential on the fuel channel is easy to understand.

The high water pressure from the inside of the fuel bundle acts towards the low water pressure in the core bypass region to the outside of the fuel bundle through the fuel channel wall. The square section channel is subjected to pressure forces that in the absence of resistance would cause the square sectioned channel to become cylindrical. Responsive to this pressure difference, the channel deflects away from the lower tie-plate. During reactor operation, the channel is subject to a neutron flux. The neutron flux, in combination with the stresses due to the pressure loading, causes the channel to creep so that the channel deflection increases with time.

It is known to place a reinforcing band around the bottom of the channel at the lower tie-plate to prevent leakage. It will be appreciated that the interstitial volume between fuel bundles defines the volume for control rod excursion and control of the reaction. As far as bands used for channel reinforcement extend into this region, their added dimension is not desired. Further, insofar as such reinforcement adds to the neutron absorbing mass of the channel, the resultant reaction causes a loss of efficiency.

SUMMARY OF THE PRIOR ART

In the prior art, the lower tie-plate has been provided with indentations passing along the area of overlap of the channel. These indentations accommodate side-by-side spring biased fingers. These fingers are spring biased from the tie-plate outwardly to and towards the channel.

These spring biased fingers occupy the interstitial volume between the channel and the tie-plate. As the channel deflects away from the tie-plate, the fingers move into the increasing interstitial volume and block fluid flow. Thus, the expansion due to both pressure differential and radiation induced creep does not cause excessive leakage.

Unfortunately, such springs are themselves a contributor to the undesired expansion of the channel at the lower tie-plate, since the springs apply a load to the channel.

SUMMARY OF THE INVENTION

In a nuclear boiling reactor, an improved lower tie-plate and fuel channel interface for a boiling water reactor fuel bundle is disclosed. The fuel bundle has a lower tie-plate for supporting fuel rods and permitting the introduction of fluid interior of the fuel bundle. An upper tie-plate maintains the lower tie-plate supported rods in side-by-side relation and has apertures for discharging a mixture of water and steam. The fuel rods extend between the tie-plates for the generation of steam with some of the fuel rods forming a threaded connection fastening the tie-plates together. A polygon sectioned channel, preferably square, surrounds the tie-plates and fuel rods for the confining of fluid flow between the tie-plates interior of the bundle. The interface of the channel as it surrounds the lower tie-plate is reconfigured. This reconfiguration includes means for inducing a rapid pressure drop from the interior juncture of the lower tie-plate and channel to and towards the exterior juncture of the lower tie-plate and channel. This rapid pressure drop leaves the bottom portion of the square sectioned channel without a pressure load. In one embodiment, a labyrinth seal configuration is made in the lower tie-plate consisting of intermittent interruptions of an otherwise constant flow area between the lower tie-plate channel. The labyrinth seal is disclosed as configured either in the lower tie-plate or channel. In a preferred embodiment, a venturi flow configuration with diffuser is provided so that pressure drop in accordance with Bernoulli's principle effects reduced pressure between the lower tie-plate and channel. This reduced pressure reinforces the unstressed and lower portion of the channel with a (negative) hydraulic force applied to counter the (positive) force of outward channel bowing. Reverse venturi flow channel with diffusers are configured at the corners of the channel and adjacent lower tie-plate. These reversed venturi flow channels provide a resricted metered flow during reactor operation from the interior of the fuel bundle to the exterior core bypass region. At the same time and during a loss of coolant accident, a low pressure flow path for reflood of the fuel bundles is provided.

Other Objects, Features, and Advantages

An object to this invention is to disclose a reconfiguration of the lower tie-plate at the tie-plate channel juncture which hydraulically reinforces the channel at the tie-plate.

According to a first embodiment of this invention, a labyrinth seal is configured to the periphery of the lower tie-plate. This labyrinth seal consists of intermittent horizontal pockets interrupting an otherwise constant section flow path configured between the tie-plate on one hand and the channel on the other hand. This labyrinth seal effects an immediate drop in pressure of water trying to pass from the relatively high pressure region interior of the fuel bundle to the low pressure region in the core bypass region exterior of the fuel bundle.

An advantage of the labyrinth seal configuration is that the lowermost portion of the channel is left in an unloaded configuration. In this unloaded configuration, it suitably reinforces the overlying portion of the channel subjected to a hydraulic differential force. Thus, the overlying portion of the channel subjected to a high pressure interior from within the fuel bundle and a low pressure exterior in the core bypass region is in effect reinforced by the lower unloaded portion of the channel.

According to a second and preferred embodiment of this invention, a venturi flow region is deliberately configured in the lower tie-plate immediate the lower portion of the fuel bundle channel. This venturi channel includes a diffuser for inducing a favorable pressure distribution over the lower portion of the fuel bundle channel.

An advantage of this aspect of the invention is that the lower portion of the fuel channel experiences a (negative) hydraulic force with respect to the core bypass volume. This negative hydraulic force in addition to the unloaded portion of the fuel channel coacts upon the channel to maintain improved proximity to the lower tie-plate.

A further advantage of this latter configuration is that the greater the tendency of the channel to bow away from the lower tie-plate, the greater the velocity of the flow through the venturi. The greater the velocity of the flow through the venturi, the stronger the hydraulic forces acting on the lower portion of the fuel channel. Thus, the increased hydraulic forces on the fuel channel maintain its proximity to the lower tie-plate. An improved seal results under all conditions.

A serendipitous effect follows the reinforcement of the channel by fluid flow. Since most reactors at the lower tie-plate contemplate a small amount of flow from the interior of the channel at the lower tie-plate to the exterior of the channel in the core bypass region, the required leakage for the channel reinforcement provides this required flow. Such provision of required flow to the core bypass region has the supplemental result of the hydraulic reinforcement as set forth above.

A further advantage of this invention is that no reconfiguration of the channel at the lower tie-plate is required. Rather, by reconfiguration of the lower tie-plate alone, the flow as set forth in this invention can be achieved.

A further object to this invention is to illustrate a reconfiguration of the lower tie-plate which permits fuel bundle reflood from the core bypass region in the event of a loss of coolant accident. According to this aspect of the invention, the lower tie-plate at the corner is configured to form a passage having a venturi and a diffuser. The diffuser is aligned to provide energy efficient water flow in the direction of the interior of the fuel bundle from the core bypass region. In normal operation and due to reverse flow through the diffuser only a small and metered flow is experienced from the interior of the fuel bundle to the core bypass region. During reflood, a venturi diffuser assisted low friction flow path is established from the core bypass region to the interior of the fuel bundle. Consequently, efficient reflood can easily occur.

Other objects, features and advantages of this invention will become more apparent after referring to the following specification and attached drawings in which:

Figure 1A:
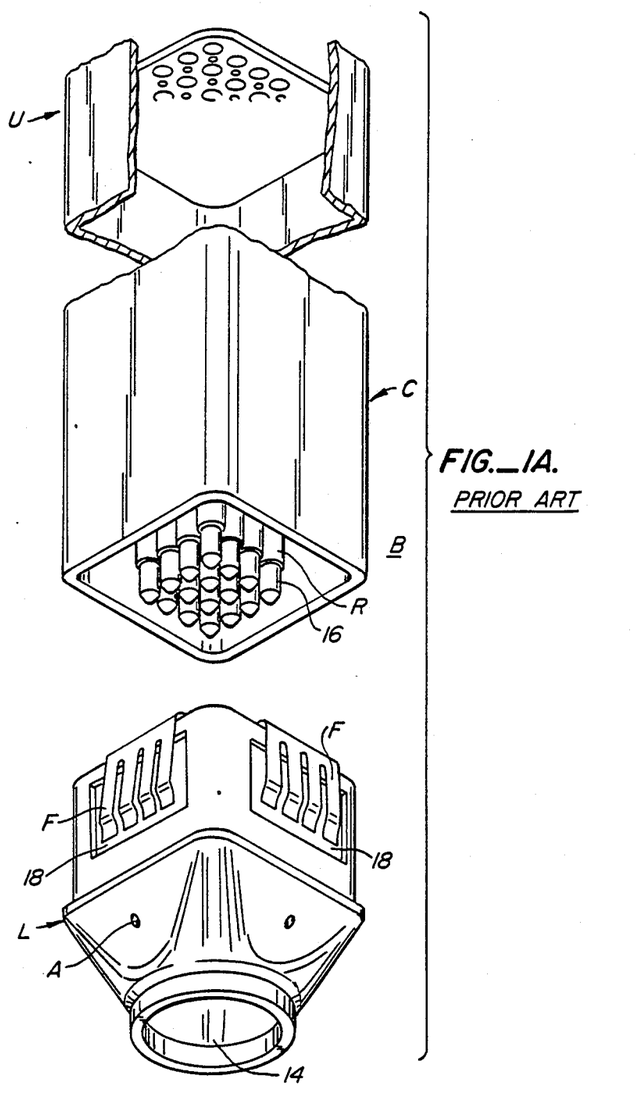
FIG. 1A is a view of the prior art at the lower tie-plate illustrating side-by-side fingers for accommodating blockage of the tie-plate channel interface during normal reactor operation.

Referring to FIG. 1A, a fuel bundle S is shown in relation to a reactor core.

The core includes two flow regions. One of these flow regions is interior of the fuel bundle, the remaining region is exterior of the fuel bundle and in core bypass region B.

A simplified description of the fuel bundle can be presented. A lower tie-plate L is illustrated. The tie-plate supports a group of fuel rods R. Some of these rods are threaded at 16. These threaded rods extend between lower tie-plate L and upper tie-plate U. The threaded rods form connections between the respective tie-plates and maintain the remaining rods in side-by-side upstanding relation. Apertures in the region between the fuel rods permit flow of water into the fuel bundle.

Extending between the two tie-plates L and U and on the outside of the fuel bundle is a channel C. Channel C forms a flow barrier between the inside of the fuel bundle F and the core bypass region B.

At the bottom of the lower tie-plate are metering apertures A. The pressure difference between the inside of the fuel bundle and the bypass region causes water to flow through the metering apertures A into the bypass region B.

As has been set forth, it is this pressure drop acting from the interior of the fuel bundle F to the core bypass region B that causes the channel C overlying the lower tie-plate L to bulge away from the sides.

The prior art has prevented unreasonable flow rates in the interstices between the sides of the lower tie-plate L and the channel C by the use of fingers F. Fingers F are typically spring biased away from the sides of indentations 18 in the lower tie-plate. Such spring bias enables the fingers F to move into the volume between the lower tie-plate L and the channel C as the channel deflects away from the lower tie-plate.

Unfortunately, such spring bias is an additional contributing factor to channel deflection.

Figure 1B:
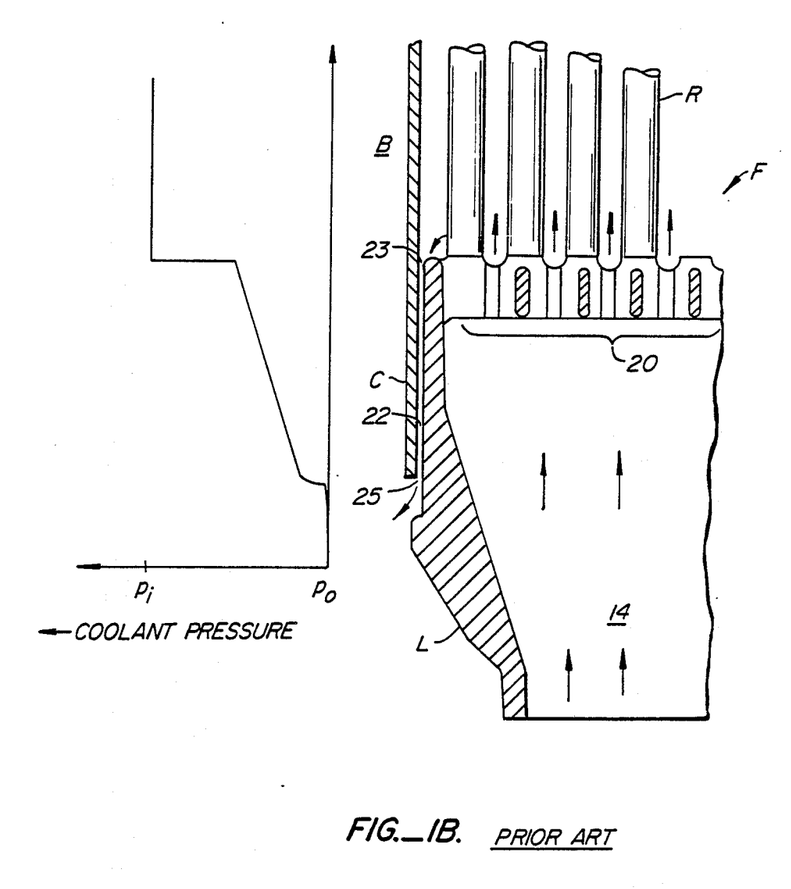
FIG. 1B is a side elevation section of a prior art lower tie-plate during normal operation illustrating adjacent the section the fluid pressure acting on the channel wall from the inside of the channel towards the outside of the channel.

Referring to FIG. 1B, a section of the lower tie-plate L at the channel C is illustrated. This Figure shows how leakage flow occurs without finger springs, or other means for limiting leakage flow. Specifically, water under pressure enters aperture 14 flowing upwardly through a grid 20 for support of the individual fuel rods R. After passage through grid 20, some water finds its way into the interstitial flow volume 22 defined between the lower portion of the channel C and the overlapping portion of the channel tie-plate L. The pressure effect produced on this portion of the channel can be seen with respect to the coolant pressure diagram plotted with respect to the channel C.

Remembering that a pressure $P_i$ is present on the interior of the fuel bundle F, it will be seen that channel C above the lower tie-plate L is under a complete pressure differential between the core bypass region B and the interior of the fuel bundle F. Water passing in the interstitial area 22 gradually loses its pressure until escape from the bottom of the channel at 25. Consequently, coolant pressure likewise falls gradually over the length of the channel as it is illustrated. Such pressure experiences an immediate drop at the entrance to the channel at 23 until an almost full drop is realized upon exit at 25.

Figure 2:
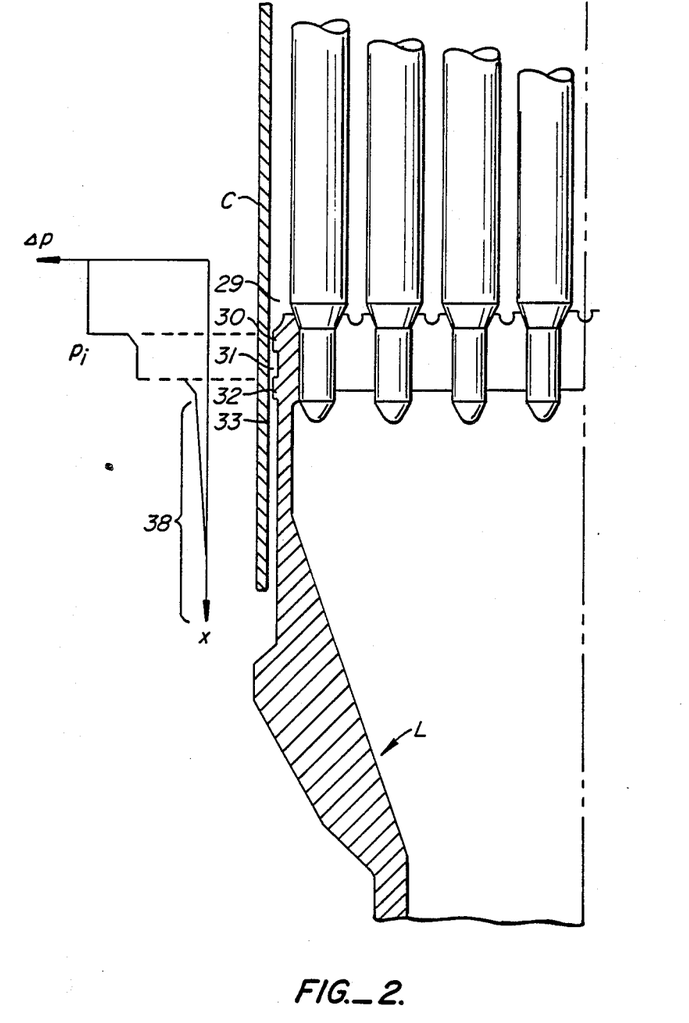
FIG. 2 is an illustration of one of the embodiments of this invention similar to FIG. 1B demonstrating the use of labyrinth seals configured in the lower tie-plate for providing improved resistance to leakage flow.

Referring to FIG. 2, an embodiment of this invention is illustrated.

Lower tie-plate L is shown. The lower tie-plate includes first and second labyrinth seal rings 30, 32. These labyrinth seal rings define expanded flow areas 31, 33.

Functions of labyrinth seals are well known. Specifically, the labyrinth seals provide expanded volumes for inefficient turbulent flow to occur immediately after each of the constricted apertures 30, 32. Such expanded and inefficient flow causes large and rapid pressure differentials across the labyrinth seal.

Referring to the flow diagram, it can be seen that the labyrinth seal matrix of the respective seals 30, 32 produces a rapid and full pressure between the entrance to the seal 29 and the region below the seal 38.

The portion 38 of the channel C underlying this rapid pressure drop area has no pressure load acting on it. The part of the channel which is not loaded can thereafter reinforce the overlying portions of the channel.

Figure 3:
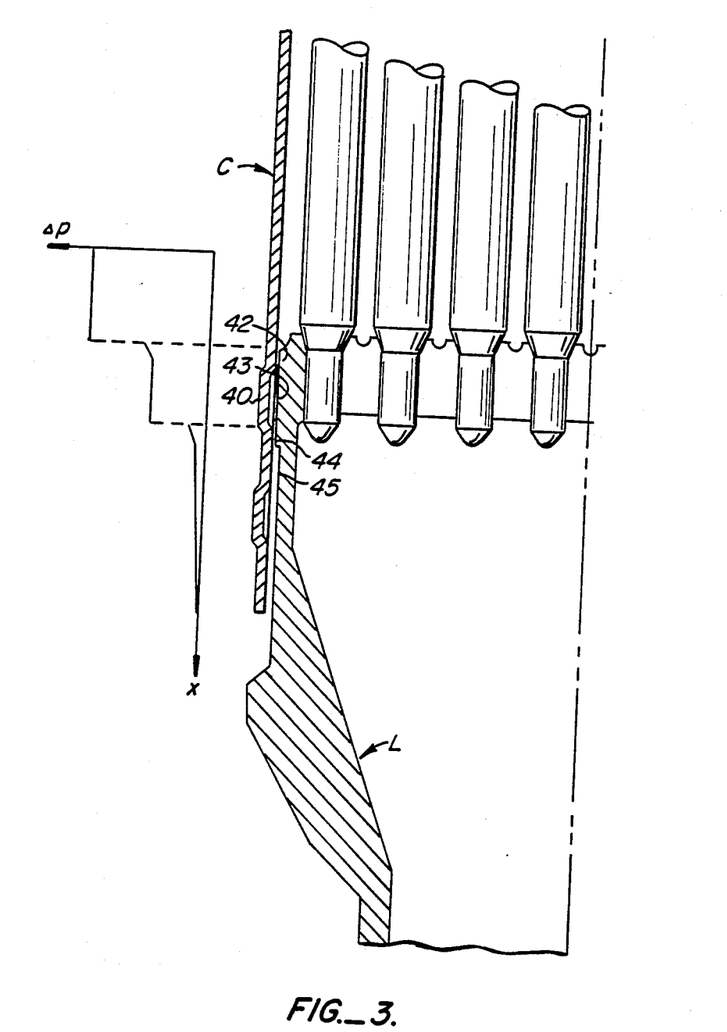
FIG. 3 is a diagram similar to FIG. 2 illustrating the configuration of the channel wall to provide labyrinth seal.

Referring to FIG. 3, the reader can understand that it is possible for a labyrinth seal to be configured by both cooperative shaping of the lower tie-plate L and the channel C. According to this embodiment, channel C is provided in the vicinity of the lower tie-plate L with corrugations, which corrugations 40 define with respect to the lower tie-plate L successive contracted regions of flow 42, 44 followed by expanded regions of flow 43, 45. These respective regions of flow define a labyrinth seal along the length of the interstitial volume between the channel C and the lower tie-plate L.

Figures 4A, 4B, 4C:
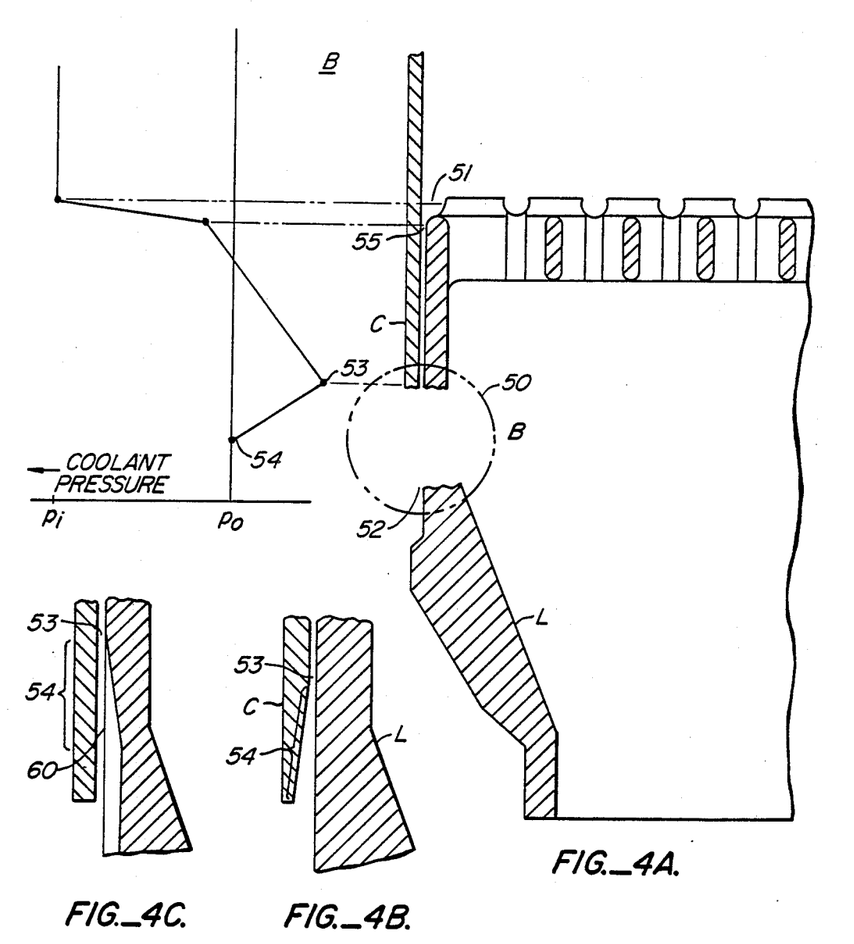
FIGS. 4A, 4B, and 4C are respective sections of a venturi flow configuration, a section of a channel forming the venturi flow configuration and finally a section of a tie-plate forming the venturi flow configuration; and, FIG. 5A and 5B are respective plan and a section at the corner of the channel of either FIGS. 2, 3, 4A, 4B, and 4C illustrating a reverse diffuser at the channel corner for providing improved flow on reflood.

Referring to FIGS. 4A, 4B, and 4C, a preferred embodiment of this invention is illustrated. A lower tie-plate L and channel C are shown. The area of the improvement herein is shown by circular detail 50.

Referring to FIG. 4B, a first detail is illustrated. Specifically, channel C against lower tie-plate L defines a diffuser volume 54, diffuser volume 54 includes an initial venturi flow 53.

Referring to the diagram configured opposite to FIG. 4A, the effect of this can be seen. Specifically, at inflow area 51, pressure exceeds that of the core bypass region $P_o$. However, between the region above the aperture 51 and the beginning of the aperture 55 there is a large increase in flow velocity and a corresponding decrease in pressure, in accordance with Bernoulli's theorem. Between the beginning of the aperture 55 and the beginning of the diffuser 53 there is an additional pressure drop caused by friction losses over the length of the aperture. Thereafter, and due to the action of the diffuser, pressure slowly increases until it equalizes to the pressure of the core bypass region at $P_o$.

In accordance with this aspect of the invention, not only does the lower unloaded portion of the channel C reinforce the overlying loaded portion of the channel but additionally, a negative pressure acts inwardly in the vicinity of the lower portion of the channel C at the tie-plate.

It is important to notice that this negative pressure will increase upon increasing deflection. That is to say, the very effect of pressure induced deflection, which it is the purpose of this invention to combat, causes increased flow with increased negative pressure differential.

The reader will also understand that by configuration of the lower tie-plate at 60 on FIG. 4C, the same effect can be reached. Specifically, a pressure drop at the aperture 53 is formed. Moreover, a diffuser 54 is present. Thus, by either the configuration of the lower tie-plate L or the bottom of the channel C, the hydraulic forces on the channel C counteract the bulging forces heretofore set forth.

Having set forth the invention as relates to the sides of the channel adjacent the lower tie-plate, attention can now be directed to an improvement at the corners of the polygon sectioned (square sectioned) channel.

Corners are an unavoidable leakage path. Because of manufacturing considerations, a gap is intentionally designed at the corners and a snug fit between channel and lower tie-plate is designed over the sides. Because of difficulty in maintaining tight tolerances there is uncertainty in this leakage.

Figure 5A:
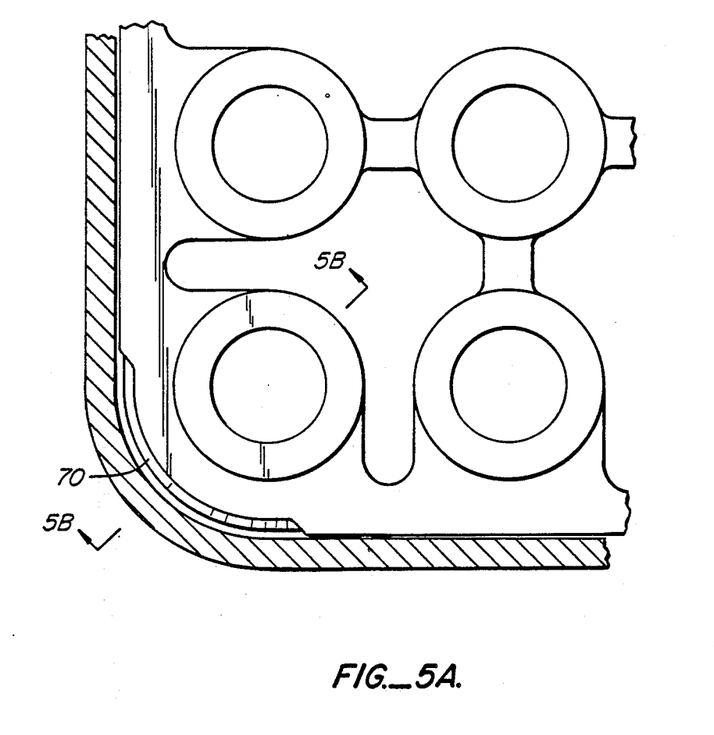
Figure 5B:
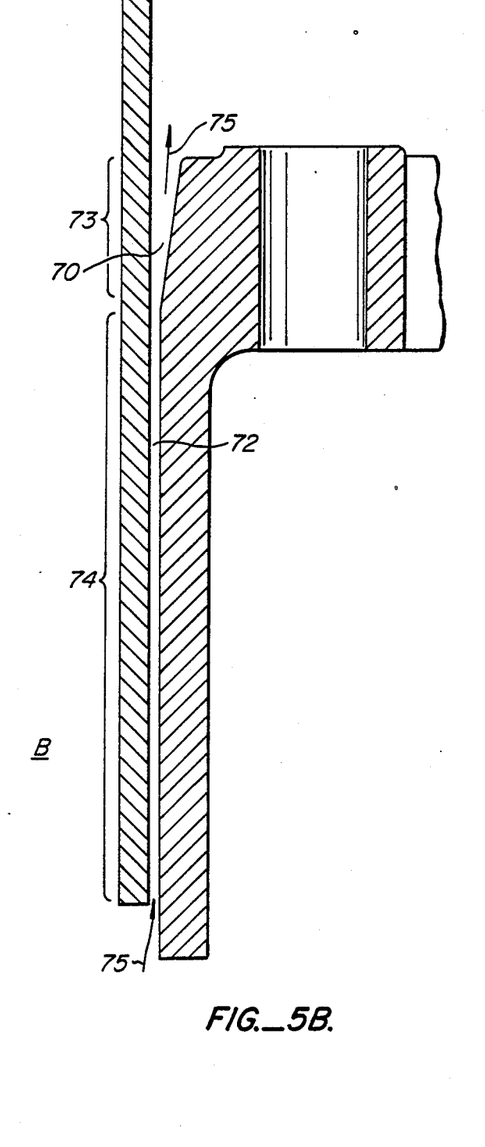

Referring to FIG. 5, a diffuser 70 is shown placed at the corner of the lower tie-plate L between the channel C and the tie-plate. FIG. 5A shows a top view of one corner of the lower tie-plate, and FIG. 5B show a section through the corner. This diffuser, however, is reversed. It includes an aperture 72 disposed towards the core bypass region B and a diffuser aligned to and towards the interior of the fuel bundle F.

The purpose of this reverse diffuser can be easily understood.

First, reference will be made to the aperture A in the prior art of FIG. 1A. Thereafter, and with a brief explanation, a return to FIG. 5 will illustrate the principles involved.

In the prior art, and for the purposes of reflood of the fuel bundles F, aperture A serves two purposes. During normal reactor operation, aperture A permits a small and metered amount of water to pass from the interior of the fuel bundle F to the core bypass region B. In such passage, a pressure drop was experienced, which pressure drop enabled metered flow under low pressure to the core bypass region B.

Upon a loss of coolant accident, aperture A is intended to have a reverse flow. In such a reverse flow it enables water flooding the core bypass region B to pass interior of the fuel bundles F. In such passage, the fuel rods R remained flooded and are not subjected to the consequences of overheating.

Turning to FIG. 5B, the function of the reverse diffuser can be set forth. During normal operation, flow will typically be down the diffuser section 73 to the aperture 72. Thereafter, flow will pass through in a constant metered flow the length of the aperture 74 until discharged to the core bypass B occurs. Such flow can be relatively constant and metered. Thus, the reverse diffuser configuration can serve the function of metering water from the interior of the fuel bundle F to the core bypass region B.

Upon reflood, the water flow will be reversed as shown by arrows 75.

As is well known in the hydraulic arts, by aligning the diffuser with respect to flow, an efficient expansion of flow occurs with an accelerated passage. Thus, with the reverse diffuser here disclosed, reflood of the fuel bundle F from the core bypass region B will occur with greater efficiency.

The reverse diffuser has very little effect on the leakage flow during normal operation. Some of the pressure drop is friction as the flow passes through the gap, most is the loss in energy as the exiting jet dissipates its energy in the bypass region.

During reflood the diffuser acts as a diffuser. There is very little pressure loss as the flow exits from the gap through the diffuser, into the fuel bundle. Thus the time to reflood is reduced. Thus, the only new feature is the enhancement of reflooding provided by the corner diffusers.

I claim:

1. In a fuel bundle for confining fuel rods for the generation of steam in a steam water mixture passing interior of the fuel bundle and wherein said fuel bundle includes; a lower tie-plate for supporting said fuel rods and permitting flow from the lower exterior portion of said fuel bundle into the interior portion of said fuel bundle;

a plurality of fuel rods, said fuel rods supported on said lower tie-plate extending upwardly to and towards the upper portion of said fuel bundle for the generation of steam in a passing steam and water mixture interior of said fuel bundle;

an upper tie-plate for maintaining said fuel rods in side-by-side relation and permitting a threaded connection between a plurality of said fuel rods with said threaded connection being at said upper and lower tie-plate, said upper tie-plate permitting escape of a steam water mixture from the top of said fuel bundle;

a fuel bundle channel extending from a position surrounding said upper tie-plate to a position surrounding said lower tie-plate, the improvement to said lower tie-plate comprising;

a labyrinth seal configured in said lower tie-plate, said labyrinth seal configured in the interstitial volume between the upper portion of said lower tie-plate adjacent the interior of said channel and said channel at the point of overlap to said lower tie-plate for providing rapid pressure decline, whereby the lower portion of said channel is not loaded by pressure and reinforces the overlying stressed portion of said channel.

2. The invention of claim 1 and wherein said labyrinth seal is configured in said lower tie-plate.

3. The invention of claim 2 and wherein said labyrinth seal is configured in said lower tie-plate and said channel.

4. In a fuel bundle for containing fuel rods for the generation of steam in a steam water mixture wherein said fuel bundle includes; a lower tie-plate for supporting said fuel rods and permitting flow from the lower exterior portion of said fuel bundle into the interior portion of said fuel bundle;
- a plurality of fuel rods supported on said lower tie-plate and extending upwardly in side-by-side relation;
- an upper tie-plate for maintaining said fuel rods in side-by-side relation and permitting threaded connection between a plurality of said fuel rods and said upper and lower tie-plates, and for permitting the escape of a steam water mixture from the top of said fuel bundle;
- a fuel bundle channel extending from a position surrounding said upper tie-plate to the position surrounding said lower tie-plate for confining steam and water flow between said tie-plates around said fuel bundles, the improvement to said lower tie-plate at the channel comprising:
- a flow aperture followed by a diffuser; said flow aperture being disposed towards the top of said lower tie-plate and said diffuser being disposed away from said aperture to and towards the core bypass region at the lower portion of said tie-plate to produce a pressure decline;
- whereby the pressure at said aperture and diffuser is below the pressure of said core bypass region whereby the lower portion of said channel reinforces the upper pressure loaded portion of said channel against channel deflection.

5. The invention of claim 4 and wherein said aperture and diffuser is configured in said lower tie-plate.

6. The invention of claim 4 and wherein said aperture and diffuser are configured in the lower portion of said channel.

7. In a fuel bundle for confining fuel rods for the generation of steam in a steam water mixture wherein said fuel bundle includes;
- a lower tie-plate for supporting said fuel rods and permitting flow from the lower exterior portion of said fuel bundle into the interior portion of said fuel bundle;
- a plurality of side-by-side fuel rods supported on said lower tie-plate and extending upwardly of said fuel bundle;
- an upper tie-plate for maintaining said fuel rods in side-by-side relation and permitting threaded connection through said rods between a plurality of fuel rods to join said upper and lower tie-plate, said upper tie-plate forming an aperture for permitting the escape of steam and water mixture from the top of said fuel bundle;
- a fuel bundle channel extending from a position surrounding said upper tie-plate to a position surrounding said lower tie-plate, the improvement at said lower tie-plate comprising in combination a flow aperture and diffuser configured at a corner section of said fuel bundle between said core bypass region and the interior of said fuel bundle; said diffuser aligned to diffuse water flow from said core bypass region to and towards the interior of said fuel bundle whereby reflood of said fuel bundle through said aperture and diffuser is expedited.

8. The invention of claim 7 and wherein said flow aperture is configured in said lower tie-plate.

* * * * *